United States Patent [19]

Reilly et al.

[11] 4,246,587

[45] Jan. 20, 1981

[54] THERMAL ARRAY PROTECTION METHOD AND APPARATUS

[75] Inventors: Edward J. Reilly, Mayfield Heights; Glenn L. Williams, Bay Village, both of Ohio

[73] Assignee: Gould Inc., Rolling Meadows, Ill.

[21] Appl. No.: 72,542

[22] Filed: Sep. 4, 1979

[51] Int. Cl.³ .................................... G01D 15/10
[52] U.S. Cl. .............................. 346/1.1; 346/76 PH
[58] Field of Search ............ 346/1, 76 PH; 216/219

[56] References Cited

U.S. PATENT DOCUMENTS

| | | | |
|---|---|---|---|
| 3,555,241 | 1/1971 | Carlsen et al. | 219/216 |
| 3,567,904 | 3/1971 | Carlsen et al. | 346/76 PH X |
| 3,577,137 | 5/1971 | Brennan, Jr. | 346/76 PH |
| 3,874,493 | 4/1975 | Boyd | 346/76 PH X |
| 3,934,695 | 1/1976 | Kovalick | 346/76 PH X |
| 4,070,587 | 1/1978 | Hanakata | 346/76 PH X |
| 4,149,171 | 4/1979 | Sato et al. | 346/76 PH X |

Primary Examiner—George H. Miller, Jr.
Attorney, Agent, or Firm—Barry L. Tummino; Russell E. Baumann; Edward E. Sachs

[57] ABSTRACT

A thermal array protection method and apparatus are disclosed primarily for use in linear thermal array imaging devices. Data to be printed within a given line of data are compared to the data printed within the previous line of data. Data will not print in the given line of data if data were printed in the corresponding data positions within the previous line of data. Thus, the temperature of the individual thermal imaging stylii will be kept within acceptable limits.

19 Claims, 8 Drawing Figures

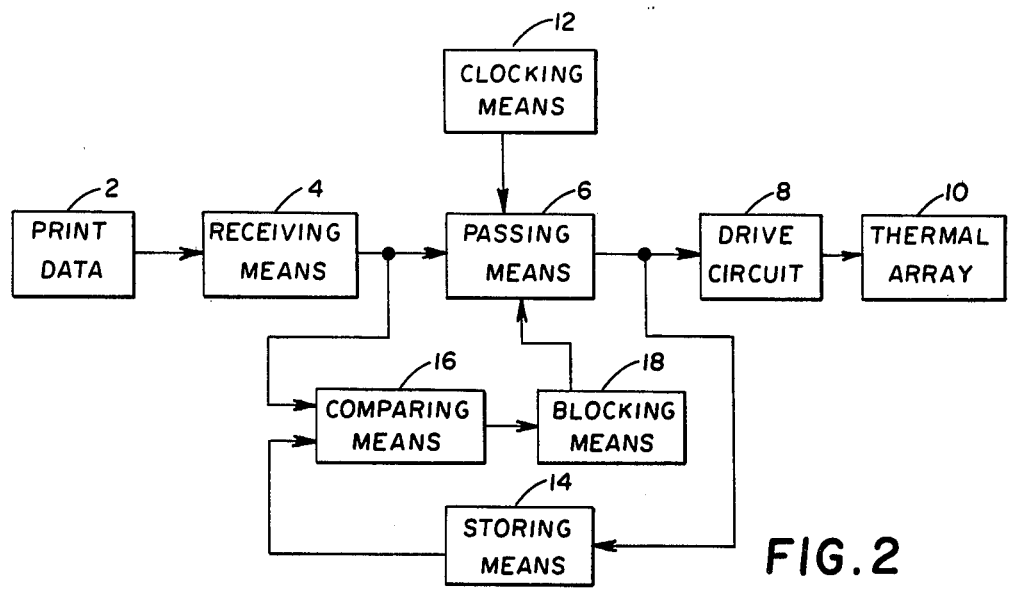
FIG.2
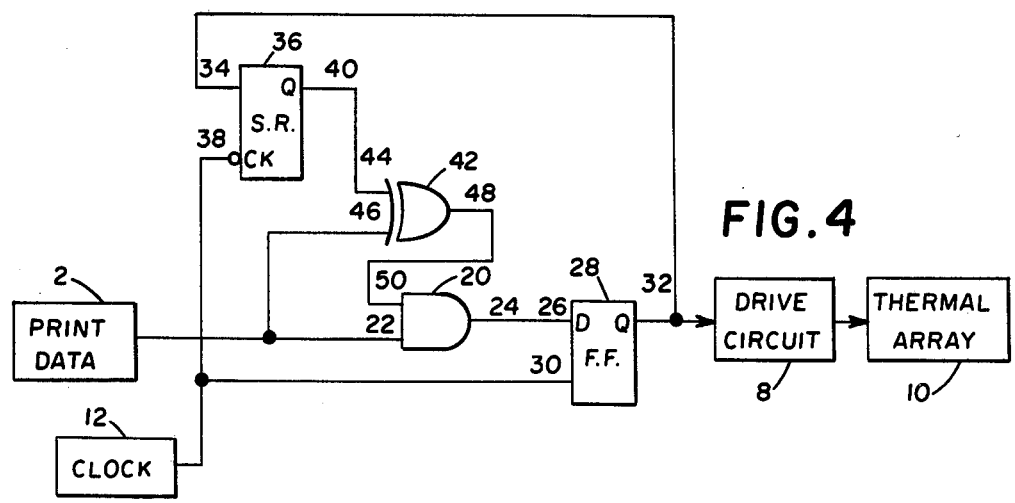
FIG.4
| 22/46 | 44 | 50/48 | 24 |
|---|---|---|---|
| 0 | 0 | 0 | 0 |
| 0 | 1 | 1 | 0 |
| 1 | 0 | 1 | 1 |
| 1 | 1 | 0 | 0 |
FIG.5

FIG. 6

THERMAL ARRAY PROTECTION METHOD AND APPARATUS

BACKGROUND OF THE INVENTION

The present invention relates to thermal array imaging, printing or recording devices and is more particularly directed to a protection method and apparatus to prevent overheating of the thermal array device.

It is known in the art to fabricate thermal recording devices having imaging stylii arranged in a linear array. Such devices typically are comprised of a plurality of stylii which are formed by disposing electrically resistive material on an insulating substrate to form a plurality of individual stylii in a single row. These stylii are electrically connected to driver circuits. Each stylus is selectively energized by the driver circuits to produce Joule heat. When the stylii are brought into contact or suitable proximity with a thermally sensitive imaging medium, each energized stylus makes a mark on the medium. The stylii typically are spaced at a density of 100 stylii per inch and may require as much as one watt of power to raise the temperature of a single stylus to a level suitable for imaging. Energizing the stylii at a high repetition rate can cause overheating or even burn out of the stylii. Overheating of the stylii can also cause smudging or shadows on the recording medium.

To avoid an occurrence of overheating in thermal array stylii, the prior art teaches the use of various types of temperature compensating circuits. One such circuit, disclosed in U.S. Pat. No. 3,577,137 to James Brennan, Jr., uses a temperature sensor to sense the temperature of the stylii. The power applied to the stylii then is adjusted in order to reduce the heat. Such circuits require calibration and are therefore expensive to build and maintain and can also be subject to reliability problems.

Another method taught by the prior art to prevent overheating of a thermal array stylii is to control the "on" time of the incoming print command. U.S. Pat. No. 4,070,587 to Takayoshi Hanakata discloses a circuit using a "one shot" control principle, so that the drive current to the thermal stylus is cut off by the "one shot" after a predetermined interval. Such circuits, however, will not protect against overheating of the thermal stylii caused by rapid repetition of the stylus drive current.

Still another way to prevent overheating is accomplished in the prior art by the use of large metal heatsinks and by air cooling. Such devices add weight to the device and are not very efficient.

OBJECTS OF THE INVENTION

An object of the invention is to provide a protection method and apparatus for thermal arrays which reduce the severity of heating problems known in prior art of thermal imaging devices.

Another object of the invention is to provide such a protection method and apparatus which have greatly improved efficiency of stylii temperature reduction, yet are simple to practice and manufacture.

Still another object of the invention is to provide a protection method and apparatus which enable a thermal imaging array to operate at higher data rates than were heretofore achievable.

The above objects are given by way of example. Thus other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. A method and an apparatus are provided for use in thermal array imaging, printing or recording devices to prevent heat build up and thermal burn out of the stylii. An incoming digital line of data comprised of individual datum positions is received. The line of data is passed to a thermal array current drive circuit and simultaneously stored. A new line of data is then received. Data in individual datum positions in the new line of data received will be blocked from passing to the thermal array current drive circuit for those corresponding positions in which the stored line of data had the existence of data. The datum that is passed in the new line of data will be stored in order to be used for the next line of data received. The sequence is then repeated by the method and apparatus of the invention for each next line of data received.

BRIEF DESCRIPTION OF THE DRAWINGS

FIG. 2 is a block diagram showing another generalized embodiment of the present invention;

FIG. 4 is a circuit diagram showing an embodiment of the present invention according to the generalized embodiment shown in FIG. 2;

FIG. 5 is a truth table for a portion of the embodiment shown in FIG. 4;

FIG. 6 is a print out representation for illustrating the operation of the embodiment shown in FIGS. 1 and 2;

DESCRIPTION OF THE PREFERRED EMBODIMENTS

Figure 1:
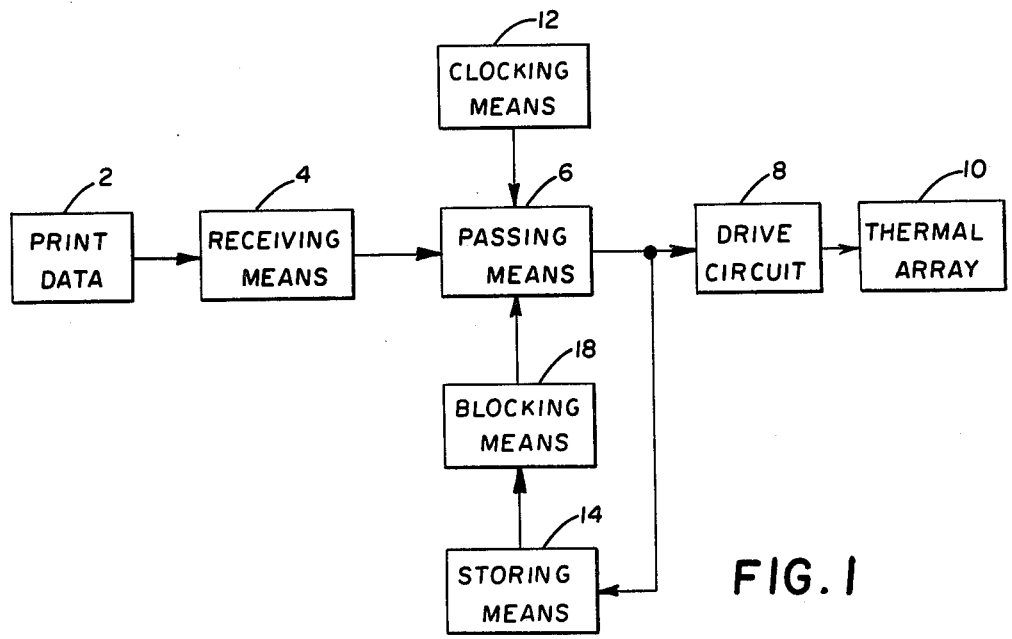
FIG. 1 is a block diagram showing a generalized embodiment of the present invention.

A description of the invention follows, referring to the drawings in which like reference numerals denote like elements of structure in each of the several Figures.

In this application, the word HIGH is used, as is known in the art, to represent a digital voltage level. A digital HIGH in this application will also be designated by the numeral "1" and will be referred to as a logic state 1. The word LOW is used, as is known in the art, to represent a different, lower digital voltage level. A digital LOW in this application will also be designated by the numeral "0" and will be referred to as a logic state 0. The voltage levels that define a digital HIGH or a digital LOW will depend on the type of digital devices used. For example, if Transistor-Transistor Logic (TTL) is used, a digital LOW will typically be from 0.0 to 0.8 volts d.c. and a digital HIGH will be from 2.0 to 5.5 volts d.c.

FIG. 1 is a block diagram showing a generic embodiment of the apparatus according to the present invention. Print data is generated by a suitable source 2 and transmitted to a receiving means 4. The print data coming from source 2 is a series of digital lines of data which may be representative of an analog waveform. Each line of data comprises individual datum points located in individual datum positions. The number of datum positions in each line corresponds to the number of stylii in the thermal print head. For example, if the print head has 512 stylii, there will be 512 datum positions in each line of data received. IF a digital HIGH or a logic state 1 is present in a particular datum position, this will be interpreted as data existing in that position. The line of data received is passed by passing means 6 to a current drive circuit 8. The current drive circuit 8 powers each individual stylus within the thermal array 10. For example, if data exist in datum positions 21 through 50 and 176 through 200 and are passed by passing means 6, the current drive circuit 8 will power stylii 21 through 50 and 176 through 200. A clocking means 12 is operatively connected to the passing means 6 in order to synchronize and position the line of data passing to the individual stylus to be driven. If there are 512 stylii in the print head, there will be 512 clock pulses per line of data; each clock pulse corresponding to a separate stylus to be driven.

The line of data passed by passing means 6 is also stored in storing means 14. The next line of data is then received by receiving means 4. As each individual datum position is received by receiving means 4, the storing means 14 passes its stored data to blocking means 18 such that the datum positions being received by the receiving means 4 correspond to the datum positions being passed to blocking means 18 by storing means 14. The blocking means 18 will prevent the passing of data for all positions for which data exist in the corresponding stored line of data. In the previous example, the first line of data had data in datum positions 21 through 50 and 176 through 200. If the next line of data had data in datum positions 16 through 25 and 190 through 250, the blocking means 18 prevents passing of data from occurring in the same datum positions in two The storing means 14 then stores the passing of data for datum positions 16 through 20 and 201 through 250 and the same stylii positions are powered by the current drive circuit 8. The result is to prevent the passing of data from occuring in the same datum positions in two successive lines of data received. As will be discussed infra, this has no adverse effect on the resultant print out but can yield a reduction of power output up to a maximum of 50%. An effective reduction of power supplied to the thermal array stylii means a reduction in heat build up and the prevention of a possible stylii burn out.

FIG. 2 is a block diagram showing another embodiment of the apparatus according to the present invention. A comparing means 16 is provided and is operatively connected to receiving means 4 and storing means 14. Comparing means 16 is then operatively connected to blocking means 18. Each datum position in the new line of data received is compared to the corresponding datum position in the line of data stored in storing means 14 by use of the comparing means 16. If the comparing means 16 determines that data exist in corresponding datum positions, comparing means 16 sends a signal to blocking means 18 such that blocking means 18 will block data for the corresponding position or positions from passing through passing means 6.

Figure 3:
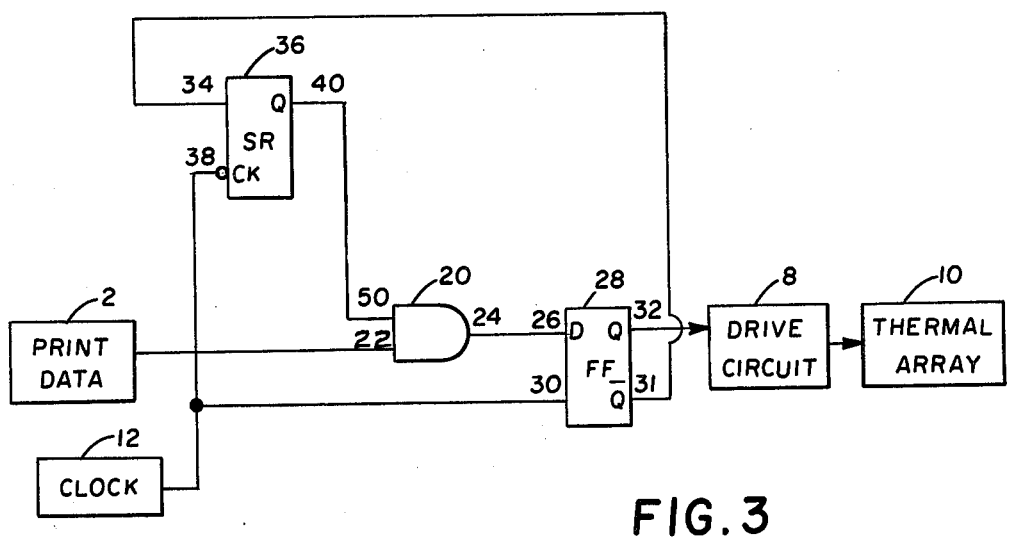
FIG. 3 is a circuit diagram showing an embodiment of the present invention according to the generalized embodiment shown in FIG. 1.

FIG. 3 illustrates a specific embodiment of the invention according to the embodiment shown in FIG. 1. The print data from source 2 is a series of lines of data comprising individual datum positions as described above. The line of data is received by AND gate 20 through one of its inputs 22. The line of data passes from the output 24 of AND gate 20 to the input 26 of FLIP-FLOP 28. Clocking means 12 is connected to the clock input 30 of FLIP-FLOP 28. The FLIP-FLOP 28 positions and synchronizes the line of data received to the stylii to be driven. The output 32 of FLIP-FLOP 28 is connected to the drive circuit 8. The drive circuit 8 is connected to the thermal array 10 and provides the power to each individual stylus in the stylii. The stylii are driven in accordance with the same mode of operation as described above. The output 31 of FLIP-FLOP 28 is connected to input 34 of shift register 36. The clocking means 12 is connected also to the clock input 38 of shift register 36. The shift register 36 is of the type selected to correspond to the number of datum positions within a line of data. As in the previous examples, if a line of data has 512 positions, shift register 36 will have 512 positions. The effect of shift register 36, as will be apparent to those skilled in the art, is to invert and delay the line of data passed by one line of data. Thus, the first datum position clocked through the output 40 of shift register 36 will be synchronized with and correspond to the first datum position of the next line of data received.

Output 40 of shift register 36 is connected to input 50 of AND gate 20. It will be apparent to those skilled in the art that AND gate 20 acts as a blocking means to allow incoming data to be passed only when data does not exist in the correspond datum position in the stored line of data. AND gate 20 also acts as a receiving means. The effect of this circuit embodiment is to prevent the passing of data to the driving means if data exist in corresponding datum positions within two successive lines of data received. Moreover, if a particular stylus is powered in one line of data, it will not be powered in the next line of data even if data exist in that position.

FIG. 4 illustrates another specific embodiment of the invention. The general mode of operation of this circuit is the same as that of the generalized embodiment shown in FIG. 2. An EXCLUSIVE-OR gate 42 is provided as a comparing means. The output of shift register 36 is connected to input 44 of EXCLUSIVE-OR gate 42. The incoming print data from source 2 is connected to the other input 46 of EXCLUSIVE-OR gate 42. This means that the input 46 of EXCLUSIVE-OR gate 42 is connected to input 22 of AND gate 20. The output 48 of EXCLUSIVE-OR gate 42 is connected to the other input 50 of AND gate 20.

FIG. 5 shows the truth table for the operation of the EXCLUSIVE-OR gate 42 in conjunction with AND gate 20. There are two inputs in the truth table. The first input is designated as 22/46 which represents input 22 of AND gate 20 and input 46 of EXCLUSIVE-OR gate 42. The second input is designated 44 which is the second input of EXCLUSIVE-OR gate 42. The column designated 50/48 in the truth table of FIG. 5 represents output 48 of EXCLUSIVE-OR gate 42 which is also the input 50 of AND gate 20. It can be seen from this truth table that a logic state 1 will occur at the output 24 of AND gate 20 when there is a logic state 1 at 22/46 and a logic state 0 at 44. It will, therefore, be apparent to those skilled in the art that AND gate 20 acts as a blocking means to allow the incoming data to be passed only when data exist in a datum position of the new line of data received and there was no data in the corresponding datum position of the previous line of data.

The circuits in FIGS. 3 and 4 are not limited to construction with discrete or individual components. These protection circuits may be formed into hybrid integrated circuits which may, in turn, lead to a reduction in the number of components.

An individual stylus can use one watt of power to generate a sufficient amount of Joule heat to make a mark on thermally sensitive paper. If there are 512 stylii in an array and a line of incoming data has data in all 512 positions, the stylii would use 512 watts of power. If every successive line also contains datum in all positions, this invention would yield an effective reduced power output of 50% since only every other line of data after the first line of data would be printed.

Figure 6:
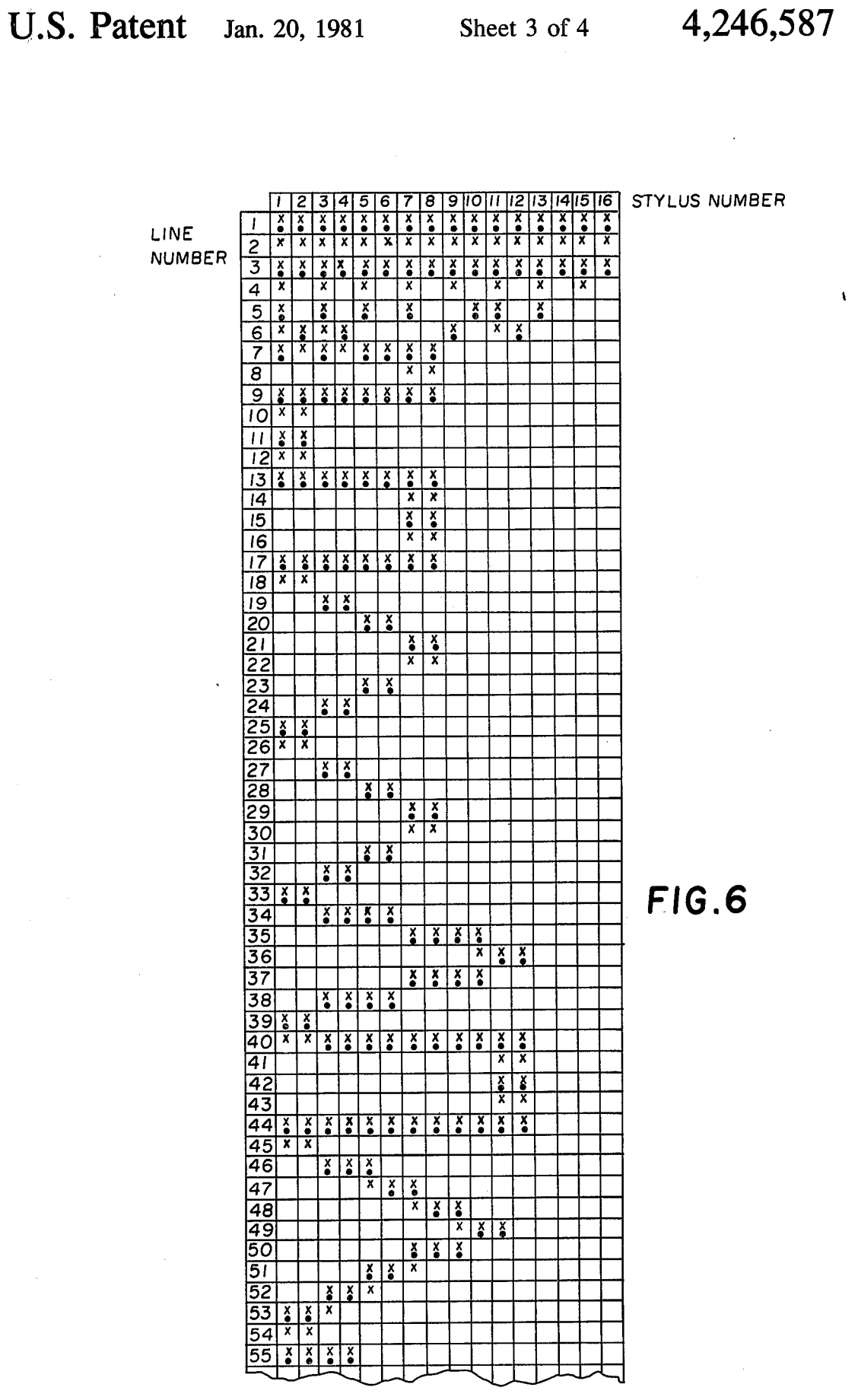

FIG. 6 shows a print out pattern generated by the present invention for a thermal array containing 16 stylii. An "x" represents datum received within a line of data and the "." represents the mark that would be made on the thermally sensitive paper by the stylii.

Figure 7:
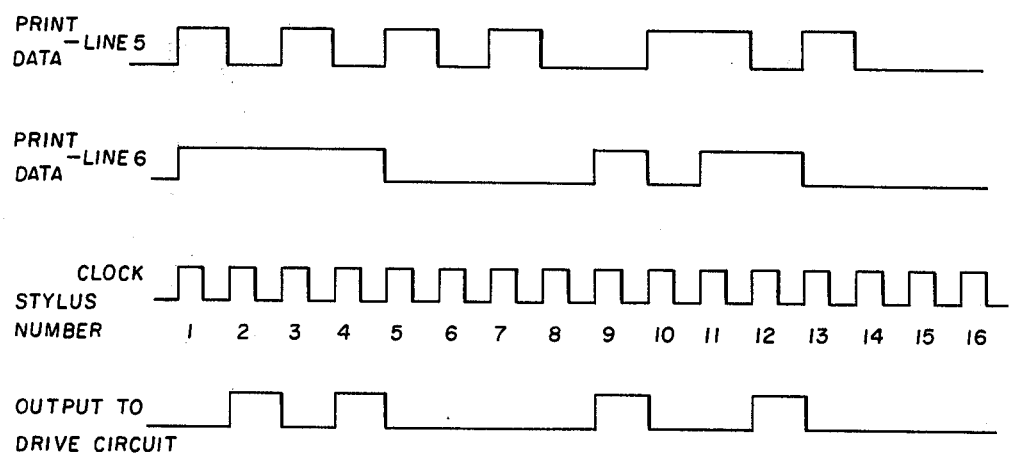
FIG. 7 is a signal waveform representation for illustrating the operation of the embodiment shown in FIG. 4.

FIG. 7 shows the digital waveform pattern for a line of data received by the circuits shown in FIGS. 3 and 4. Lines of data received are lines 5 and 6 of FIG. 6; line 5 being the previous line of data received and line 6 being the new line of data received. The output data passed to the drive circuit 8 is shown in FIG. 7 and the print pattern is shown in FIG. 6, line 6.

Figure 8:
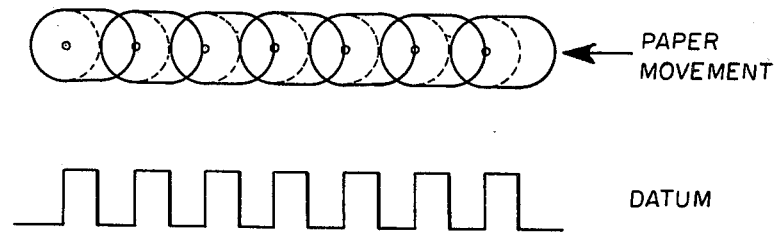
FIG. 8 is a dot pattern representation for illustrating the overlap phenomena that occur in thermal printers.

FIG. 6 is only a diagrammatical representation of what the typical print out would look like in actual practice of this invention. A typical thermal linear array may contain 512 stylii at a spacing of 100 stylii per inch. New lines of data can typically be received at a rate of 200 lines per second. An individual energized stylus will make a mark on a thermal sensitive paper approximately 0.25 mm in diameter, assuming a stylus of approximately that size. A maximum paper speed in a thermal recording device in an orthogonal directon from the linear array can typically be 50 mm per second. FIG. 8 shows a dot pattern produced by one stylus pulsed at a rate of 200 hertz with the paper moving at 50 mm per second. It can be seen that there is an overlapping of data for successive positions. At even moderate paper speed, there can be an overlapping of data by as much as eightfold or more, i.e., there can be as many as eight data or more printed at least partially on top of each other. Thus, it will be apparent to those skilled in the art that there will be no loss of resolution and no appreciable effect in the print out by the use of the present invention. But, it will also be apparent that there will be a reduction in the heat produced by the thermal array when the stylii are pulsed at a high repetition rate.

Use of the protection method where the protection circuit is not limited to thermal array devices but can be used in any display device that receives successive lines of data wherein the lines of data comprise a plurality of individual data separated into a number of datum positions.

This invention has been described with reference to preferred embodiments. Obvious modifications and alterations will occur to others upon reading and understanding this specification. The intention is to include all such modifications and alterations insofar as they come within the scope of the appended claims or the equivalent thereof.

What we claim is:

1. A method for thermal array protection for use in thermal imaging apparatuses of the type having a linear array of heat-generating resistive elements used to place marks on thermal sensitive recording media during printing operations, said method comprising the steps of:
   a. receiving an incoming digital first line of data from an appropriate source, said first line of data comprising a plurality of individual datum;
   b. passing said received digital first line of data to a driving means for current driving thermal array stylii;
   c. clocking the passing first line of data to position and synchronize the individual datum within said first line of data to the individual stylus to be driven;
   d. storing said passing first line of data;
   e. receiving an incoming digital second line of data from said appropriate source, said second line of data comprising a plurality of individual datum; and
   f. blocking the passing to said driver means of the individual datum within the second line of data for those positions in which data exists in corresponding positions of the stored first line of data.

2. The thermal array protection method of claim 1, further comprising the steps of:
   g. passing the datum not blocked from said second line of data to said driving means;
   h. clocking the passing of the unblocked datum of said second line of data to position and synchronize said unblocked datum of said second line of data to the individual stylus to be driven;
   i. storing said unblocked datum of said second line of data;
   j. receiving an incoming digital next line of data from said appropriate source, said next line of data comprising a plurality of individual datum; and
   k. blocking the passing to said driving means of the individual datum within said next line of data for those positions in which data exist in corresponding positions of the stored unblocked datum of said second line of data.

3. The thermal array protection method of claim 2, wherein the steps of passing, clocking, storing, receiving and blocking are repeated for each new line of data received.

4. The thermal array protectin method of claim 2, wherein the steps of passing, clocking, storing, receiving, comparing and blocking are repeated for each new line of data received.

5. A method for thermal array protection for use in thermal imaging apparatuses of the type having a linear array of heat-generating resistive elements used to place marks on thermal sensitive recording media during printing operations, said method comprising the steps of:
   a. receiving an incoming digital first line of data from an appropriate source, said first line of data comprising a plurality of individual datum;
   b. passing said received digital first line of data to a driving means for current driving thermal array stylii;
   c. clocking the passing first line of data to position and synchronize the individual datum within said first line of data to the individual stylus to be driven;
   d. storing said passing first line of data;
   e. receiving an incoming digital second line of data from said appropriate source, said second line of data comprising a plurality of individual datum;
   f. comparing each datum position within the stored first line of data to the second line of data to determine if datum exists in corresponding positions; and g. blocking the passing to said driver means of the individual datum within the second line of data if datum exists in the corresponding positions of the previous line of data passed as determined in the comparing step.

6. The thermal array protection method of claim 5 further comprising the steps of:

h. passing the datum not blocked from said second line of data, to said driving means;

i. clocking the passing of the unblocked datum of said second line of data to position and synchronize said unblocked datum of said second line of data to the individual stylus to be driven;

j. storing said unblocked datum of said second line of data;

k. receiving an incoming digital next line of data from said appropriate source, said next line of data comprising a plurality of individual datum;

l. comparing each datum position within the stored unblocked datum of said second line of data to the next line of data to determine if datum exists in corresponding positions; and m. blocking the passing to said driven means of the individual datum within said next line of data if datum exists in the corresponding positions of the previous line of data passed as determined in the comparing step.

7. A thermal array protection apparatus for use in thermal imaging apparatuses of the type in which a linear array of heat-generating resistive elements used to place marks on thermal sensitive recording media during printing operations, said protection apparatus comprising:

receiving means to receive an incoming digital line of data from an appropriate source, said line of data comprising a plurality of individual datum;

passing means operatively connected to said receiving means to pass the digital line of data received to a driving means for current driving the thermal array stylii;

clocking means operatively connected to said passing means to position and synchronize the individual datum within said digital line of data received to the individual stylus to be driven;

storing means operatively connected to the output of said passing means for storing the datum passed through said passing means; and blocking means operatively connected to said storing means and said passing means to block the passing of the individual datum from said next line of data received for those positions which said storing means has stored datum.

8. The thermal array protection apparatus of claim 7, wherein said storing means is updated each time datum is passed by said passing means.

9. The thermal array protection apparatus of claim 7, wherein said storing means is also operatively connected to said clocking means.

10. The thermal array protection apparatus of claim 7, wherein said storing means is a shift register.

11. The thermal array protection apparatus of claim 7, wherein said blocking means is an AND gate.

12. The thermal array protection apparatus of claim 7, wherein said passing means is a FLIP-FLOP.

13. A thermal array protection apparatus for use in thermal imaging apparatuses of the type in which a linear array of heat-generating resistive elements is used to place marks on thermal sensitive recording media during printing operations, said protection apparatus comprising:

receiving means to receive an incoming digital line of data from an appropriate source, said line of data comprising a plurality of individual datum;

passing means operatively connected to said receiving means to pass the digital line of data received to a driving means for current driving the thermal array stylii;

clocking means operatively connected to said passing means to position and synchronize the individual datum within said digital line of data received to the individual stylus to be driven;

storing means operatively connected to the output of said passing means for storing the datum passed through said passing means;

comparing means operatively connected to the receiving means and the storing means to compare the datum positions of the stored data in said storing means to the datum positions of the next line of data received by said receiving means and determine when datum exists in corresponding positions; and blocking means operatively connected to said comparing means and said passing means to block the passing of the individual datum from said next line of data received for those positions which said comparing means determined the existence of corresponding datum.

14. The thermal array protection apparatus of claim 13, wherein said storing means is updated each time datum is passed by said passing means, whereby said comparing means always compares the datum passed in the previous line of data to the next imcoming line of data.

15. The thermal array protection apparatus of claim 13, wherein said storing means is also operatively connected to said clocking means.

16. The thermal array protection apparatus of claim 13, wherein said storing means is a shift register.

17. The thermal array protection apparatus of claim 13, wherein said comparing means is an EXCLUSIVE-OR gate.

18. The thermal array protection apparatus of claim 13, wherein said blocking means is an AND gate.

19. The thermal array protection apparatus of claim 13, wherein said passing means is a FLIP-FLOP.

* * * * *

UNITED STATES PATENT AND TRADEMARK OFFICE
CERTIFICATE OF CORRECTION

PATENT NO. : 4,246,587
DATED : January 20, 1981
INVENTOR(S) : Reilly et al

It is certified that error appears in the above—identified patent and that said Letters Patent are hereby corrected as shown below:

Column 1, line 31, "compensating" should be --compensation--.

Column 3, line 6, "IF" should be --If--.

Column 3, line 35, "had" should be --has--.

Column 3, line 37, "occurring in the same datum positions in two" should be --positions 21 through 25 and 190 through 200.--

Column 6, line 42, "protectin" should be --protection--.

Signed and Sealed this

Twenty-sixth Day of May 1981

[SEAL]

Attest:

RENE D. TEGTMEYER

Attesting Officer	Acting Commissioner of Patents and Trademarks